US010242505B2

United States Patent
Clement et al.

(10) Patent No.: US 10,242,505 B2
(45) Date of Patent: Mar. 26, 2019

(54) SYSTEM AND METHOD RELATING TO MOVEMENT IN A VIRTUAL REALITY ENVIRONMENT

(71) Applicant: GOOGLE INC., Mountain View, CA (US)

(72) Inventors: Manuel Christian Clement, Felton, CA (US); Stefan Welker, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 12 days.

(21) Appl. No.: 15/594,095

(22) Filed: May 12, 2017

(65) Prior Publication Data

US 2017/0330386 A1   Nov. 16, 2017

Related U.S. Application Data

(60) Provisional application No. 62/335,417, filed on May 12, 2016.

(51) Int. Cl.
*G06F 3/01* (2006.01)
*G06T 19/20* (2011.01)

(52) U.S. Cl.
CPC .............. *G06T 19/20* (2013.01); *G06F 3/011* (2013.01); *G06F 3/013* (2013.01); *G06T 2200/04* (2013.01); *G06T 2200/24* (2013.01); *G06T 2219/024* (2013.01); *G06T 2219/2016* (2013.01)

(58) Field of Classification Search
None
See application file for complete search history.

(56) References Cited

U.S. PATENT DOCUMENTS

| 5,423,554 A | 6/1995 | Davis |
|---|---|---|
| 2002/0022516 A1 | 2/2002 | Forden |
| 2011/0029903 A1 | 2/2011 | Schooleman et al. |
| 2011/0107216 A1* | 5/2011 | Bi .......................... G06F 3/011 715/716 |
| 2013/0335405 A1* | 12/2013 | Scavezze ................ G06T 19/20 345/419 |

(Continued)

FOREIGN PATENT DOCUMENTS

| EP | 0959444 A1 | 11/1999 |
|---|---|---|
| EP | 1406218 A1 | 4/2004 |

(Continued)

OTHER PUBLICATIONS

International Search Report and Written Opinion for PCT Patent Application No. PCT/US2017/032449, dated Jul. 11, 2017, 13 pages.

(Continued)

*Primary Examiner* — Kyle Zhai
(74) *Attorney, Agent, or Firm* — Brake Hughes Bellermann LLP

(57) ABSTRACT

In at least one general aspect, a method can include determining a physics parameter based at least in part on a scale of user relative to an object in a virtual reality environment, applying a physics rule to an interaction between the user and the object in the virtual reality environment based on the physics parameter, and modifying the physics parameter based at least in part on a relative change in scale between the user and the object.

19 Claims, 7 Drawing Sheets

(56) References Cited

U.S. PATENT DOCUMENTS

2015/0375128 A1  12/2015  Villar et al.

FOREIGN PATENT DOCUMENTS

JP          8-98212 A     4/1996
WO    2011/163011 A2   12/2011
WO    2017/197287 A1   11/2017

OTHER PUBLICATIONS

"Physics Manipulation", Physics Manipulation—Superpower Wiki—Wikia (http://powerlisting.wikia.com/wiki/Physics_Manipulation), printed Nov. 27, 2015, 3 pages.

Waugh, Rob , ""Laws of physics "are different" depending on where you are in the universe"", Daily Mail (htlp:/Avww.dailymail.co.uk/sci/\cetecfVarticle-2056018/Laws-physics-change-depending-u™verse.html), Nov. 1, 2011, 18 pages.

\* cited by examiner

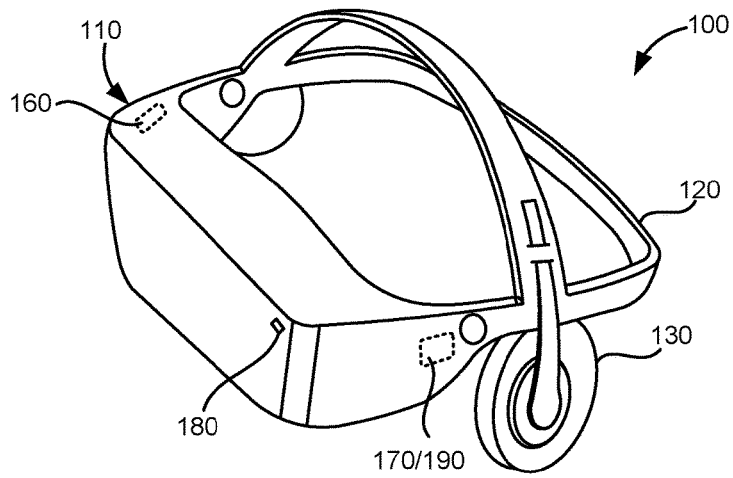
FIG. 2A
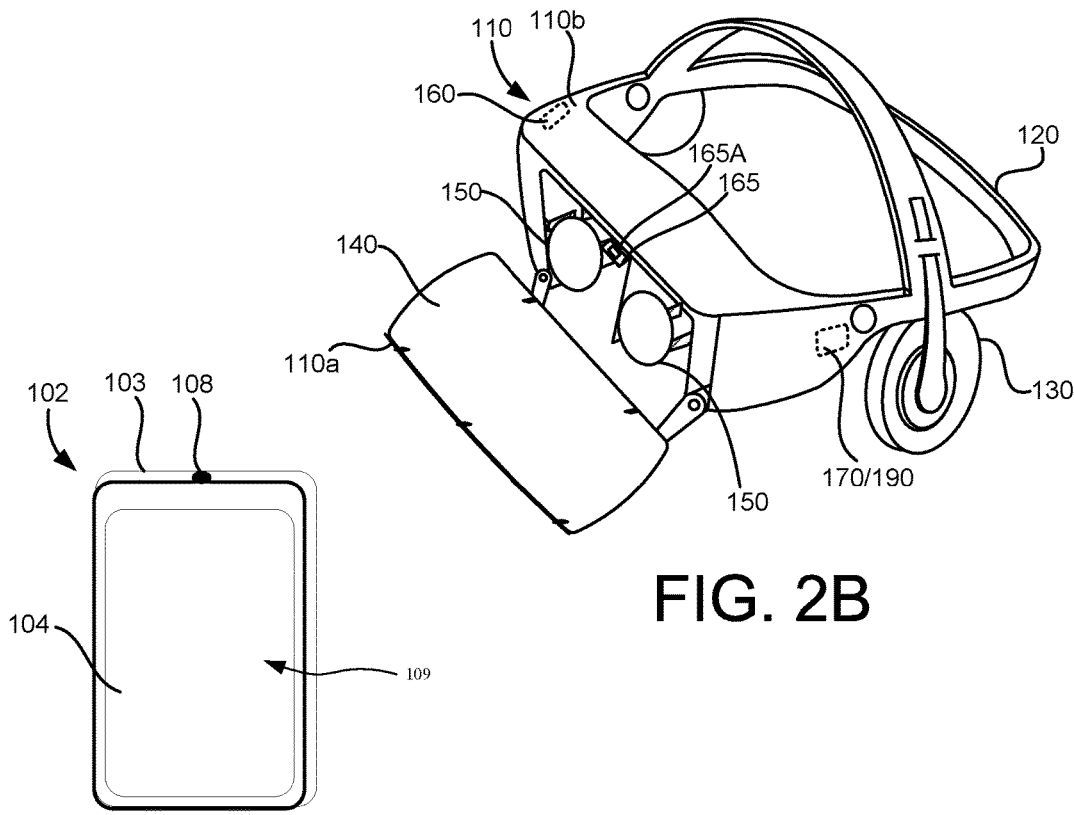
FIG. 2B
FIG. 2C

SYSTEM AND METHOD RELATING TO MOVEMENT IN A VIRTUAL REALITY ENVIRONMENT

RELATED APPLICATION

This application claims the priority benefit of U.S. Provisional Patent Application No. 62/335,417, filed on May 12, 2016, and entitled "INTERACTIONS IN A VIRTUAL REALITY ENVIRONMENT FROM DIFFERENT SIZE PERSPECTIVES," the entirety of which is incorporated herein by reference.

TECHNICAL FIELD

This description generally relates to generating a virtual reality environment with which a user may interact. In particular, the description relates to modifying one or more virtual reality physics rules (and/or parameters include therein), based at least in part on modifying a scale of the user interacting within the virtual reality environment.

BACKGROUND

Virtual reality systems, such as headsets, computer systems, controllers, haptic feedback systems and the like may be used at least in part so a user, or a graphical representation of a user, may interact with a particular virtual reality environment. Such virtual reality systems may include a computer and/or a microprocessor, a display device, a speaker, and a feedback system. The virtual reality systems may generate a virtual reality environment within which a user may interact. Furthermore, such a system may provide a user with audio, visual, or mechanical feedback based at least in part on the user's interactions with the virtual reality environment.

SUMMARY

In one aspect, a method—may include determining a physics parameter based at least in part on a scale of user relative to an object in a virtual reality environment, applying a physics rule to an interaction between the user and the object in the virtual reality environment based on the physics parameter, and modifying the physics parameter based at least in part on a relative change in scale between the user and the object.

In another aspect, a method may include determining a scale of a user relative to a virtual reality environment, the virtual reality environment having an associated virtual physics rule, determining a parameter of the virtual physics rule based on a change in the scale of the user relative to the virtual reality environment, and applying the virtual physics rule and the parameter to an interaction between the user and the virtual reality environment.

In another aspect, a system may include a computing device configured to generate a virtual environment. The computing device may include a memory storing executable instructions and a processor configured to execute the instructions. Execution of the instructions may cause the computing device to determine a physics parameter based at least in part on a scale of user relative to an object in a virtual reality environment, apply a physics rule to an interaction between the user and the object in the virtual reality environment based on the physics parameter, and modify the physics parameter based at least in part on a relative change in scale between the user and the object.

The details of one or more implementations are set forth in the accompanying drawings and the description below. Other features will be apparent from the description and drawings, and from the claims.

BRIEF DESCRIPTION OF THE DRAWINGS

FIGS. 2A and 2B are more detailed diagrams of a virtual reality headset shown in FIG. 1.

FIG. 2C is a more detailed diagram of a device shown in FIG. 1.

Like reference symbols in the various drawings indicate like elements.

DETAILED DESCRIPTION

Figure 1:
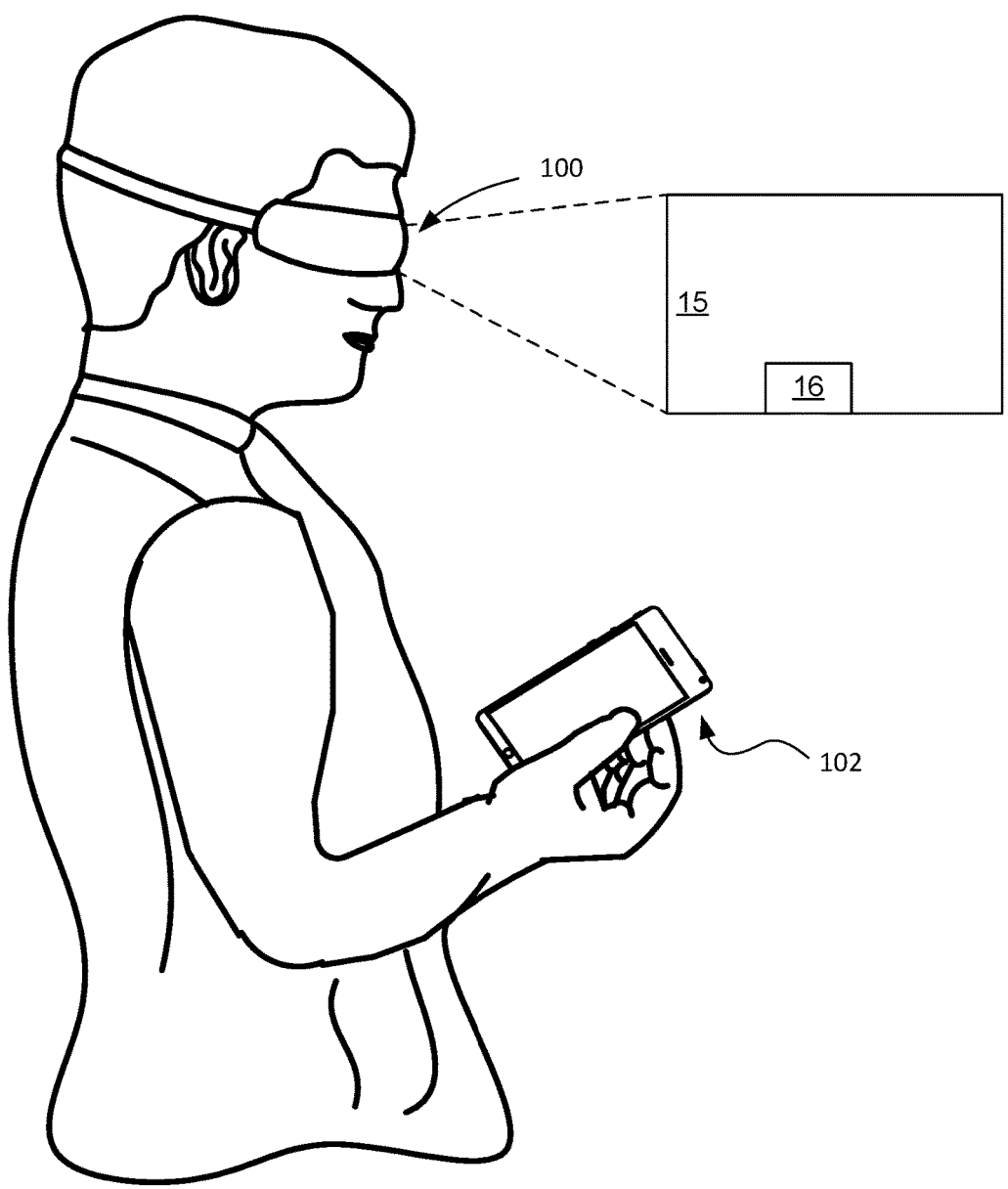
FIG. 1 is a diagram of a user and one or more virtual reality devices, in accordance with an example embodiment.

As shown in FIG. 1, a virtual reality system may include multiple devices having respective purposes. The virtual reality system of FIG. 1 may include a virtual reality headset such as a head mounted display (HMD) 100. The virtual reality system of FIG. 1 may further include a motion sensing device and, under some circumstance, a controller, such as device 102. The user depicted in FIG. 1 may be able to control a graphical representation of a virtual reality environment 15 (and/or the user in the virtual reality environment) in conjunction with the motion sensing device or the controller. The virtual reality environment 15 can be displayed on a display included in the HMD 100 to provide an immersive visual experience for the user. In addition, such a virtual reality system may include a haptic based system or device. Such haptic based systems may provide the user with physical stimuli, such as mechanical feedback, corresponding at least in part to interactions between the graphical representation of the user, the virtual reality environment, and/or objects depicted in the virtual reality environment.

For example, the user may, within the virtual reality environment 15, interact with an object 16 (e.g., a virtual object). The object 16 can be, or can include, any of a wide variety of objects at least some of which represent or correspond to real world objects. Such an interaction may involve a graphical representation of the user (or a portion thereof) interacting with a graphical representation of the object 16 within the virtual reality environment 15. Further, such an interaction between the graphical representations may be determined, at least in part, by a virtual physics rule (also can be referred to as a physics rule) having at least one parameter (and/or value of a parameter, also referred to as physics parameter). In some implementations, the interactions may, under some circumstances be controlled by multiple virtual physics rules having (e.g., each having) at least one parameter. In some implementations, some of the virtual physics rules may have multiple parameters. In some of the implementations herein, a parameter can be used refer to a variable in a physics rule and/or a value of a variable in a physics rule. Such virtual physics rules may include an algorithm or algorithms which may be mathematical representations (e.g., approximations) of real world physics rules, such as Newtonian mechanics, quantum mechanics, electromagnetism, or the like. For example, a virtual physics rule may include a mathematical approximation of gravity, friction, force, momentum, mass, density, weight, acceleration, velocity, speed, and/or other approximations of aspects governing the interaction of matter.

In some implementations, a virtual physics rule may be designed or optimized to provide a user interacting with the object 16 (e.g., a common household item, a chair in a dollhouse, a tool, a toy, an instrument, a vehicle, a structure. etc.) in the virtual reality environment 15 with an experience that approximates a realistic interaction between the user and the object 16 in the real world. For example, the user may be able to pick up the object 16 (e.g., a milk jug) in the virtual reality environment such that audio, visual and/or haptic feedback provided to the user by the virtual reality systems may approximate how it feels and sounds for a user to pick up the object 16 in the real world.

In some implementations, in order to approximate an appropriate feel of the object 16, a virtual physics rule and/or a parameter associated with a virtual physics rule of the object 16 is modified to obtain the realistic interaction between the user and the object 16. For example, modifying the physics rule(s) (and/or parameter(s) thereof) to scale the object 16 to an appropriate size of the user. Although user may be used to describe a virtual representation in a virtual environment, the term avatar may also be used. In some implementations, the term scale can be used instead of the term size. Modifying the physics rule(s) (and/or parameter(s) of an object when scaling the object has the technical effect that the realism of interaction of a user with the object in the virtual worlds is improved. For example, consider an object being a real car weighing for example about 2000 pounds in the real world. In a virtual environment, a virtual object may be a model of the real car, the virtual object reflecting as size of the real car and having virtual physics rules and/or virtual physics parameters reflecting a weight of 2000 pounds of the car. Accordingly, interaction of the user with the virtual model of the real car in the virtual environment may occur according to said virtual physics rules and/or virtual physics parameters which let the car appear heavy in the virtual environment. When scaling the virtual object, i.e., the car, to a tenth of its size in the virtual environment, then the car looks like a toy car to the user in the virtual environment. If virtual physics rules and/or virtual physics parameters reflecting the weight of the car remain unchanged despite the scaling of the virtual object, the car looking like a toy car still appear heavy when the user interacts with it in the virtual environment, which appears unrealistic. Hence, a change of the virtual physics rule and/or the virtual physics parameter of the scaled car, for example reflecting a weight of 10 pounds, increases realism so that the scaled car appears lighter when the user interacts with it in the virtual world.

In some implementations, a virtual physics rule and/or a parameter associated with a virtual physics rule of the user is modified to obtain the realistic (or desirable) interaction between the user and the object 16. For example, modifying the physics rule(s) (and/or parameter(s) thereof) to the scale of the user in relation to the object 16.

In some implementations, a physics rule (and/or parameter thereof) can be scaled based on the scale of the user with respect to the object 16 (or other portions of the virtual environment). In one example of scaling a physics rule, if the user is a first size, a first physics rule (and/or parameter thereof) can be applied to interactions between the user of the first size and the object 16. If the user is changed to a second size (different from the first size), a second physics rule (and/or parameter thereof) (different from the first physics rule) can be applied to interactions between the user of the second |[CvP1]size and the object 16. If the user is changed to a third size (different from the first size or the second size), a third physics rule (and/or parameter thereof) (different from the first physics rule or the second physics rule) can be applied to interactions between the user of the third |[CvP2]size and the object 16. In other words, scaling a physics rule means for example applying different physics rules to interactions between a virtual user and a virtual object, depending on the scale of the user and/or the scale of the object.

Further to the example above, in some implementations, the physics rule (and/or parameters thereof) can be selected (e.g., selected from a library) based on the change in size of the user. In some implementations, the physics rule (and/or parameters thereof) can be selected (e.g., selected from a library) independent of a scale of one or more other user (and/or physics rules (and/or parameters)) associated with those one or more other users.

As another example, if the user is a first size, a parameter of a physics rule can be a first magnitude. If the user is changed to a second size (different from the first size), the parameter of the physics rule can be changed to a second magnitude (different from the first magnitude). If the user is changed to a third size (different from the first size or the second size), the parameter of the physics rule can be changed to a third magnitude (different from the first magnitude or the second magnitude). In some implementations, the magnitude of the parameter can be changed proportional to the change in size of the user. In some implementations, the magnitude of the parameter can be changed based on an equation that depends on the change in size of the user. In some implementations, the magnitude of the parameter can be changed independent of one or more parameters used in connection with the physics rule as applied to interactions between other users in the virtual environment.

In some implementations, a first physics rule (and/or parameter thereof) can be applied to interactions between a first user and the object 16 based on the scale of the first user. A second physics rule (and/or parameter thereof) (which is different from the first physics rule (and/or the parameter thereof)) can be applied to interactions between a second user and the object 16 based on the scale of the second user because the scale of the first user is different from the scale of the second user. In such implementations, the interactions of the first user with the object 16 based on the first physics rule (and/or parameter thereof) can be different than the interactions of the second user with object 16 based on the second physics rule (and/or parameter thereof) even if the same interactions were applied by the first user and the second user because of the differences between the first and second physics rule (and/or parameters thereof).

In some implementations, the example above can be modified so that a third physics rule (and/or parameter thereof), which is different than the first physics rule (and/or parameter thereof) or the second physics rule (and/or parameter thereof), can be applied to interactions of the first user with the object 16 and can be applied to interactions of the second user with the object 16. Accordingly, the same physics rule (and/or parameter thereof), which is the third physics rule (and/or parameter thereof), can be applied to interactions of both the first user and the second user. In some implementations, the third physics rule can be an intermediate physics rule that is based on a combination of the size of the first user and the size of the second user. For example, the third physics rule can be an intermediate physics rule based on an intermediate size that is between the size of the first user and the size of the second user.

In some implementations, a virtual physics rule and/or a parameter associated with a virtual physics rule of an entire virtual reality environment is modified to obtain the realistic interaction between the user and the object 16. For example, modifying the physics rule(s) (and/or parameter(s) thereof) to scale the entire virtual reality environment in relation to the user. This has the technical effect that the realism of interaction of a user with the virtual world is improved when a user is scaled from a first size to a second size being different from the first size. For example, when a user in the real word pushes a real car, the real car appears heavy to the user at real world scale, since it weighs for example about 2000 pounds. In contrast, a real world toy car at scale 1:10 appears easy to lift and push for a user in the real world, since it weighs for example 10 pounds. In a virtual reality environment, a user, a real car, and a toy car could be modeled with respective physics rules and parameters reflecting their mentioned real-world properties respectively, such that in a virtual interaction with the virtual model of the real car, the real car appearing heavy, and in a virtual interaction with the virtual model of the toy car, the toy car appearing easy to lift and push in the virtual world. When the size of the user is scaled in the virtual environment to one tenth of the user's original size. Then the toy car appears to the user like a real car in the virtual world. Increased realism in this situation means that not only appearance but also interaction with the virtual model of the toy car resembles the interaction with the virtual model of the real car. However, when scaling the user to a smaller size and maintaining the physics rules and parameters thereof of the toy car, the toy car having virtual physics rules and parameters that reflect a virtual mass of 10 pounds, then the interaction between the scaled user and the virtual model of the toy car will appear unrealistic, since the toy car, which due to the scaling of the user looks to the user like a real car in the virtual world, may appear too light since it still has physics rules and parameters reflecting a toy car. Hence, a change of the virtual physics rule and/or the virtual physics parameter of the toy car increases realism so that the toy car appears heavier to the scaled user.

In some implementations, if a scale of the user is altered, a parameter of a virtual physics rule (and/or the physics rule) may be modified. For example, the user may be a first size and interactions of the user having the first size with the object 16 may be controlled by a parameter associated with a virtual physics rule such that the user having the first size interacts with the object 16 in a manner that appears, at least approximately, like an interaction between the user and the object 16 in the real world. After the user having the first size is scaled to a second size (e.g., a smaller size or larger size than the first size), the physics parameter associated with the virtual physics rule may be altered based at least in part on a difference between the first size and the second size.

For example, the user having the first size may interact with a tree. The physics rule(s) (and/or parameter(s) thereof) in the virtual environment would enable the first size user to interact with the tree in a realistic manner. If the first size user was then scaled to the second size (e.g., smaller size) while having the same physics rule(s) (and/or parameter(s) thereof), the second size user would also interact with the tree in a similar manner. However, because the second size user having the smaller scale would observe that the interaction with the tree is the same as the first size user (who is much larger), this may create an unrealistic feel. Therefore, the physics parameter associated with the virtual physics rule of the second size user having the smaller scale may be altered based at least in part on a difference between the first size and the second size.

Similarly, in a case where the tree is a size of a pencil and the user is scaled to the second size (e.g., a larger size), for example, the user may interact with the tree in similar manner because the same physics rule(s) (and/or parameter(s) thereof) may be applied to the user (after being scaled). The user may observe that the interaction with the tree has an unrealistic feel. Thus, the physics rule(s) and/or parameters(s) thereof may need to be modified for the user (after being scaled), so that the user may interact with the tree appropriately. This, of course, is merely one example relating to modifying a virtual physics rule and/or a parameter associated with a virtual physics rule.

In some implementations, on the other hand, when the scaled second user (e.g., smaller size or larger size) has a different physics rule(s) (and/or parameter(s) thereof) applied with respect to the first user having a first scale, the scaled second user may interact with the object 16 in a realistic manner. In other words, the scaled second user may have the correct physics rule(s) (and/or parameter(s) thereof) to interact with the object 16 in an appropriate manner (i.e., simulating real world). This, of course, is merely one example relating to modifying a virtual physics rule and/or a parameter associated with a virtual physics rule.

In some implementations, in a case where the user has a smaller size, the object 16 may appear to be the same height as the small user, for example. In contrast, in some implementations, in a case where the user has a larger size, the object 16 may appear to be the size of the hand of the large user. The user having the second size may have at least one virtual physics rule or one parameter of a virtual physics rule that differs from a virtual physics rule or parameter of a virtual physics rule that may be applied to the user having the first size as described above. In this example, a physics rule or a parameter of a physics rule may be adjusted such that information provided to the virtual reality system may still appear and/or feel appropriate to the user regardless of size.

For example, friction or gravity applied to the object 16 may be altered for a relatively small user (with respect to the object 16) and/or a relatively large user (with respect to the object 16) such that the object 16 would appear to react in an appropriate way for each user depending on their size. This may be achieved by modifying a virtual physic rule or a parameter of a virtual physics rule that is applied to the object 16 (or another object interacting with the object) in the virtual reality environment 15.

As another example, a rule representing (e.g., approximating) gravity may be applied to the object 16. Such a gravity rule may, however, be modified based at least in part on a scale of the user. A gravitational force may be decreased for the large user so that the object 16 appears to the large user to fall at an appropriate speed. However, a user having a different scale would observe the object 16 to drop, if dropped by a user having a different scale, at a rate (based on the same gravity rule) different than what the user would expect to see.

For example, —the user having a first size drops a hammer, the physics rule(s) and/or parameters thereof of the hammer would enable the first size user to interact with the hammer in a realistic manner. The hammer will have a certain physics rule(s) and/or parameter(s) to fall to the ground based on the size of the user. If the first size user was then scaled to a second size (e.g., smaller size) while the same physics rule(s) and/or parameter(s) were applied to the hammer, the second size user would also experience dropping the hammer at a similar rate as the first size user (who is much larger) (i.e., it would take less time for the hammer to fall, and hence, makes the hammer appear as if it was falling faster (in an unrealistic manner)). Accordingly, the physics rule(s) (and/or parameters(s) thereof) of the hammer may need to be modified based on the scaled second user, so that the scaled second user may able to drop the hammer at the appropriate rate. This, of course, is merely one example relating to modifying a virtual physics rule and/or a parameter associated with a virtual physics rule.

As another example, if a relatively large user dropped the object 16, the object 16 may appear to fall too quickly from the perspective of a relatively small user according to a physics rule(s) (and/or parameter(s) thereof). If, on the other hand, the relatively small user dropped the object 16, the object 16 may appear to drop too slowly from the perspective of the large user according to a physics rule(s) (and/or parameter(s) thereof). However, the object 16 may appear to be dropped at an appropriate speed from the perspective of the user that actually dropped the object 16. This, of course, is merely one example relating to modifying a virtual physics rule and/or a parameter associated with a virtual physics rule.

In some implementations, such as those described above, the handling of actions associated with the object 16 for the two different perspectives—the small user and the large user—can be different. For example, a time period of a first action (e.g., falling) associated with object 16 for the small user can be different than a time period of the first action (e.g., falling) associated with the object 16 for the larger user. A second action (e.g., breaking, bouncing, etc.) (which can have another time period) can be included or appended to the first action for viewing by the small user or the larger user so that timing of completion of the overall event of the object 16 can be synchronized for the smaller user and the second user.

In some implementations, in a case where a relatively large user were to push the object 16, a physics rule (or a parameter thereof) related to friction, force, and/or momentum can be defined so that the relatively large user can push the object 16 with ease. However, if the same physics rule(s) (and/or parameter(s) thereof) were applied to a relatively small user with respect to the object 16, the relatively small user may be able to push the object 16 too easily. Accordingly, the physics rule(s) (and/or parameters(s) thereof) may need to be modified for the relatively small user (after being scaled), so that the relatively small user may not be able to push the object 16 as easily.

For example, if a relatively large user were to push a miniature toy car that is much smaller than the relatively large user, a physics rule (and parameter(s) thereof) could be applied such that the miniature toy car would appear to move with relative easy (without force and/or friction) due to the miniature toy car being small in relation to the size of the relatively large user. However, if the same physics rule (and/or parameter(s) thereof) were applied to a relatively small user with respect to the same miniature toy car, the miniature toy car would appear to move with relative easy (without force and/or friction) even though the miniature toy car may be larger than the relatively smaller user. The relatively small user may sense that the miniature toy car is moving in an unrealistic manner. Thus, the physics rule(s) (and/or parameters(s) thereof) may need to be modified for the relatively small user (after being scaled), so that the relatively small user may able to sense the miniature toy car moving in an appropriate fashion (e.g., at the appropriate rate, with application of the appropriate force). This, of course, is merely one example relating to modifying a virtual physics rule and/or a parameter associated with a virtual physics rule.

In some implementations, in a case where a relatively large user were to push the object 16, a physics rule (or a parameter thereof) related to friction, force, and/or momentum can be defined so that the relatively large user can push the object 16 with ease. However, if a different physics rule(s) (and/or parameter(s) thereof) were applied to a relatively small user with respect to the object 16, the relatively small user may be able to push the object 16 in an appropriate fashion (e.g., at an appropriate rate). This, of course, is merely one example relating to modifying a virtual physics rule and/or a parameter associated with a virtual physics rule.

In some implementations, a virtual physics rule and/or a parameter associated with a virtual physics rule of an entire virtual reality environment may be modified to obtain a realistic interaction between the user and the entire virtual reality environment. In other words, modifying the physics rule(s) (and/or parameter(s) thereof) to scale the entire virtual reality environment in relation to the user.

For example, the user having a first size may interact with the entire virtual reality environment. The physics rule(s) (and/or parameter(s) thereof) of the entire virtual reality environment would enable the first size user to interact in a realistic manner. If the first size user was then scaled to a second size (e.g., a smaller size or a larger size) while having the same physics rule(s) (and/or parameter(s) thereof) of the entire virtual reality environment, the second size user would also interact with the entire virtual reality environment in similar manner (based on the same physics rule(s)) as the first size user (even though the second size user is scaled to a smaller size or larger size). However, because the second size user having the smaller or larger scale would interact with the entire virtual reality environment similarly as the first size user, this creates an unrealistic feel (for one or more of the users). Therefore, the physics parameter associated with the virtual physics rule of the entire virtual reality environment may need to be altered based at least in part on the size of the user. This, of course, is merely one example relating to modifying a virtual physics rule and/or a parameter associated with a virtual physics rule.

In some implementations, on the other hand, when the scaled second user (e.g., smaller size or larger size) has a different physics rule(s) (and/or parameter(s) thereof) applied with respect to the first user having a first scale, the scaled second user may interact with the entire virtual reality environment in a realistic manner. In other words, the scaled second user may have the correct physics rule(s) (and/or parameter(s) thereof) to interact with the entire virtual reality environment in an appropriate manner (i.e., simulating real world). This, of course, is merely one example relating to modifying a virtual physics rule and/or a parameter associated with a virtual physics rule.

In some implementations, multiple users (not shown) may interact with the virtual reality environment 15. The multiple users may interact with the virtual reality environment 15 simultaneously or substantially simultaneously such that the virtual reality environment 15 may support multiple simultaneous or substantially simultaneous virtual physics rules or multiple simultaneous or substantially simultaneous parameters associated with virtual physics rules.

In some implementations, the multiple users may, under some circumstances, have multiple scales such as a first scale, a second scale, a third scale, etc. For example, a first user may be a large size, a second user may be a medium size, and a third user may be a small size that may interact with each other in the same virtual reality environment 15. In some implementations, the multiple users may have the same and/or different sizes with respect to each other.

In some implementations, the virtual reality environment 15 may include a graphical representation of a location including multiple objects, such as a virtual toy store. The virtual toy store may include a variety of toys that the multiple users may interact with within the virtual reality environment 15.

Take, for example, a graphical representation of a train set. The first user may interact with the train set in the virtual reality environment 15. In this example, the first user may, within the virtual reality environment 15, have a scale approximating a typically sized human such that the graphical representation of the train set appears to have the approximate physical dimensions and or properties that the train set has in the real world. In this way, the first user (normal-sized user) may interact with the train set in a manner, and in accordance with a first physics rule (and/or parameter thereof) that approximates how the normal-sized user would interact with the train set in the real world.

In this example, a second user may have a second scale such that the second user is the approximate size of a passenger on the train set. In this example, the second user (small user) may be able to examine details and/or interact with the train set in a manner that provides the small user with one or more pieces of information not available to the normal-sized user. A second physics rule (and/or a parameter thereof) may be applied to the second user having the second scale.

In some implementations, the first physics rule (and/or a parameter thereof) may be the same as the second physics rule (and/or a parameter thereof). For example, the first user having the first scale and the second user having the second scale may have the same physics rules (and/or a parameter thereof) relative to each other.

In some implementations, the first physics rule (and/or a parameter thereof) may be different from the second physics rule (and/or a parameter thereof). For example, the first user having the first scale and the second user having the second scale may have different physics rules (and/or a parameter thereof) relative to each other.

In some implementations, a property of the object 16 can differ depending on scale of a user. For example, the object 16 can have a first property for a first user having a first scale and the object 16 can have a second property for a second user having a second scale different from the first scale.

For example, a mass of the trainset may differ for a relatively normal-sized user as compared with a relatively small user. In this way, the normal-sized user may be able to easily push the trainset along a graphical representation of a train track and/or pick up the train set as just some examples. The trainset may have a relatively large mass for the relatively small user so that the relatively small user may not be able to push the train set along the graphical representation of the track. In this way, both the relatively normal-sized user and the relatively small user may be presented with an at least somewhat realistic depiction of their respective interactions with the train set in the virtual reality environment 15 based on their scale relative to objects in the virtual reality environment 15.

In the above example, a virtual physics rules relating to mass (virtual mass) may be the same or substantially similar for both the relatively normal-sized user and the relatively small user while a parameter to determine the virtual mass for the relatively small user may differ from a parameter to determine a virtual mass for the relatively normal-sized user. The above are merely illustrative examples and claimed subject matter is not limited in this regard.

In some implementations, the property of the object 16 can be the same for both the first user and the second user even though the first user and the second user may have different scales (or sizes). For example, a mass of the trainset may be the same for a relatively normal-sized user and for a relatively small user. Hence, both the normal-sized user and the relatively small user may sense the same characteristic property (e.g., weight, density, friction, and/or force) of the trainset, and may be able to push and/or pick up the trainset along a graphical representation of a train track in a similar manner. The trainset may (or may not) have a relatively large mass for one (or both) of the relatively small user or the relatively normal-size user. As a result, one (or both) of the relatively normal-sized user and the relatively small user may be presented with an at least somewhat realistic depiction of their respective interactions with the train set in the virtual reality environment 15 based on their scale relative to objects in the virtual reality environment 15.

In some implementations, the physics rules applied to the relatively normal-size user may be the same for all users in the virtual reality environment 15 including the relatively small user.

In some implementations, the physics rules applied to the relatively small user may be the same for all users in the virtual reality environment 15 including the relatively normal-size user.

In the example implementation shown in FIG. 1, the user wearing the HMD 100 may interact with a portable handheld electronic device 102. The handheld electronic device 102 may be, for example, a smartphone, a controller, a joystick, a haptic feedback device or another portable handheld electronic device(s) that may be paired with, and communicate with, HMD 100 for interaction in the virtual reality environment 15 generated by the HMD 100. The handheld electronic device 102 may be operably coupled with, or paired with the HMD 100 via, for example, a wired connection, or a wireless connection such as, for example, a WiFi or Bluetooth connection. This pairing, or operable coupling, of the handheld electronic device 102 and the HMD 100 may provide for communication between the handheld electronic device 102 and the HMD 100 and the exchange of data between the handheld electronic device 102 and the HMD 100. This may allow the handheld electronic device 102 to function as a controller in communication with the HMD 100 for interacting in the virtual reality environment 15 generated by the HMD 100. That is, a manipulation of the handheld electronic device 102, such as, for example, a beam or ray emitted by the handheld electronic device 102 and directed to the object 16, or feature, for selection, and/or an input received on a touch surface of the handheld electronic device 102, and/or a movement of the handheld electronic device 102, may be translated into a corresponding selection, or movement, or other type of interaction, in the immersive virtual environment 15 generated by the HMD 100.

For example, the HMD 100, together with the handheld electronic device 102, may generate a virtual environment as described above, and the handheld electronic device 102 may be manipulated to effect a change in scale, or perspective, of the user relative to the virtual features in the virtual environment 15 as described above. As a specific example, handheld electronic device 102 may be operable to modify a scale of a user such as converting a normal user to a small user in the examples above, or as described in connection with FIGS. 4A through 4C (e.g., converting giant user 402A, to medium user 402B or pedestrian user 402C, each having a different scale). In addition, handheld electronic device 102 may be further operable to allow the user to control interactions with various objects, such as object 16 (shown in FIG. 1) in the virtual reality environment 15 and may be able to do so with user representations capable of having multiple scales relative to the object 16 in the virtual reality environment 15.

FIGS. 2A and 2B are perspective views of an example HMD, such as, for example, the HMD 100 worn by the user in FIG. 1, and FIG. 2C illustrates an example handheld electronic device, such as, for example, the handheld electronic device 102 shown in FIG. 1. The handheld electronic device 102 may include a housing 103 in which internal components of the device 102 are received, and a user interface 104 on an outside of the housing 103, accessible to the user. The user interface 104 may include a touch sensitive surface 106 configured to receive user touch inputs. The user interface 104 may also include other components for manipulation by the user such as, for example, actuation buttons, knobs, joysticks and the like. In some implementations, at least a portion of the user interface 104 may be configured as a touchscreen, with that portion of the user interface 104 being configured to display user interface items to the user, and also to receive touch inputs from the user on the touch sensitive surface 106. The handheld electronic device 102 may also include a light source 108 configured to selectively emit light, for example, a beam or ray, through a port in the housing 103, for example, in response to a user input received at the user interface 104. The handheld electronic device may further include a haptic system component 109, such as a mechanical, auditory, or visual unit for providing haptic feedback to the user.

The HMD 100 may include a housing 110 coupled to a frame 120, with an audio output device 130 including, for example, speakers mounted in headphones, also be coupled to the frame 120. In FIG. 2B, a front portion 110a of the housing 110 is rotated away from a base portion 110b of the housing 110 so that some of the components received in the housing 110 are visible. A display 140 may be mounted on an interior facing side of the front portion 110a of the housing 110. Lenses 150 may be mounted in the housing 110, between the user's eyes and the display 140 when the front portion 110a is in the closed position against the base portion 110b of the housing 110. In some implementations, the HMD 100 may include a sensing system 160 including various sensors and a control system 170 including a processor 190 and various control system devices to facilitate operation of the HMD 100.

In some implementations, the HMD 100 may include a camera 180 to capture still and moving images. The images captured by the camera 180 may be used to help track a physical position of the user and/or the handheld electronic device 102 in the real world, or physical environment relative to the virtual reality environment, and/or may be displayed to the user on the display 140 in a pass through mode, allowing the user to temporarily leave the virtual reality environment and return to the physical environment without removing the HMD 100 or otherwise changing the configuration of the HMD 100 to move the housing 110 out of the line of sight of the user.

In some implementations, the HMD 100 may include a gaze tracking device 165 to detect and track an eye gaze of the user. The gaze tracking device 165 may include, for example, an image sensor 165A, or multiple image sensors 165A, to capture images of the user's eyes, for example, a particular portion of the user's eyes, such as, for example, the pupil, to detect, and track direction and movement of, the user's gaze. In some implementations, the HMD 100 may be configured so that the detected gaze is processed as a user input to be translated into a corresponding interaction in the immersive virtual experience.

Figure 3:
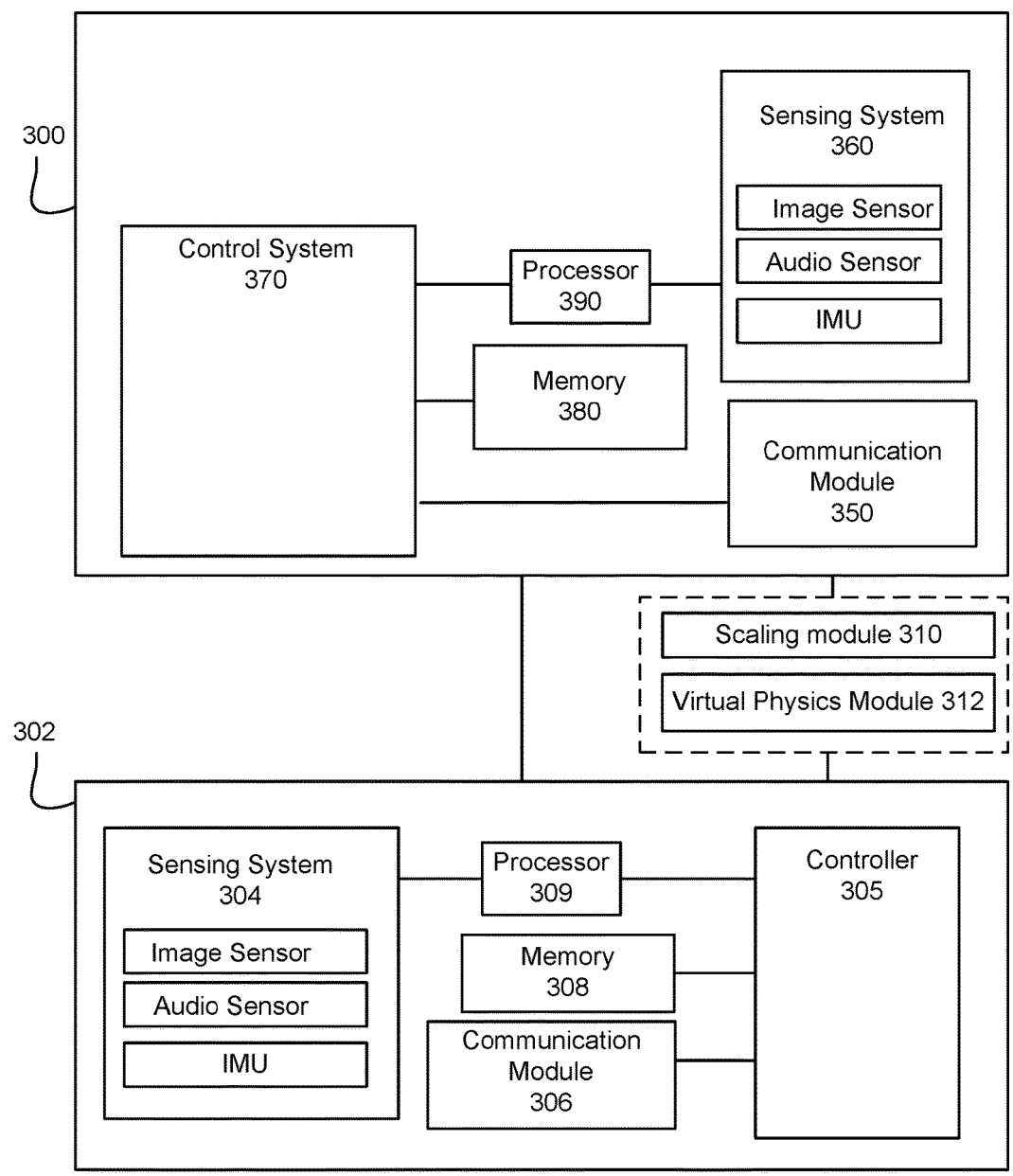
FIG. 3 depicts a diagram of components of a computing system operable to communicate or work with a virtual reality system and/or virtual reality devices.

A block diagram of a system providing scaling in a virtual reality environment is shown in FIG. 3. The system of FIG. 3 may further be operable to modify a virtual physics rule or a parameter of a virtual physics rule based at least in part on a change of scale of a user (or a depiction thereof) in a virtual reality environment (e.g., virtual reality environment 15 shown in FIG. 1). The system may include a first electronic device 300 in communication with a second electronic device 302. The first electronic device 300 may be, for example an HMD as described above with respect to FIGS. 1, 2A and 2B, generating an immersive virtual reality environment, and the second electronic device 302 may be, for example, the handheld electronic device 102 as described above with respect to FIG. 1, that is in communication with the first electronic device 300 to facilitate user interaction with a virtual reality environment generated by the first electronic device 300.

The first electronic device 300 may include a sensing system 360 and a control system 370, which may be similar to the sensing system 160 and the control system 170, respectively, shown in FIGS. 2A and 2B. The sensing system 360 may include one or more different types of sensors, including, for example, a light sensor, an audio sensor, an image sensor, a distance/proximity sensor, and/or other sensors and/or different combination(s) of sensors, including, for example, an image sensor positioned to detect and track the user's eye gaze, such as the gaze tracking device 165 shown in FIG. 2B. The control system 370 may include, for example, a power/pause control device, audio and video control devices, an optical control device, a transition control device, and/or other such devices and/or different combination(s) of devices. The sensing system 360 and/or the control system 370 may include more, or fewer, devices, depending on a particular implementation. The elements included in the sensing system 360 and/or the control system 370 may have a different physical arrangement (e.g., different physical location) within, for example, an HMD other than the HMD 100 shown in FIGS. 2A and 2B. The first electronic device 300 may also include a processor 390 in communication with the sensing system 360 and the control system 370, a memory 380, and a communication module 350 providing for communication between the first electronic device 300 and another, external device, such as, for example, the second electronic device 302.

The second electronic device 302 may include a communication module 306 providing for communication between the second electronic device 302 and another, external device, such as, for example, the first electronic device 300. In addition to providing for the exchange of data between the first electronic device 300 and the second electronic device 302, the communication module 306 may also be configured to emit a ray or beam as described above. The second electronic device 302 may include a sensing system 304 including an image sensor and an audio sensor, such as is included in, for example, a camera and microphone, an inertial measurement unit, a touch sensor such as is included in a touch sensitive surface of a handheld electronic device, or smartphone, and other such sensors and/or different combination(s) of sensors. A processor 309 may be in communication with the sensing system 304 and a controller 305 of the second electronic device 302, the controller 305 having access to a memory 308 and controlling overall operation of the second electronic device 302.

As shown in FIG. 3, the system may include a scaling module 310 and a virtual physics module 312. The scaling module 310 and/or the virtual physics module 312 can be included in and/or can be configured to communicate with the first electronic device 300 and/or the second electronic device 302.

The scaling module 310 can be configured to change a scale of a user relative to a virtual reality environment as described above. In other words, the scaling module 310 can be configured to handle aspects of scaling of a user within the virtual reality environment.

The virtual physics module 312 can be configured to modify a physics rule and/or a parameter associated with a physics rule based at least in part on a change in scale of the user implemented by the scaling module 310. The virtual physics module 312 can be configured to implement one or more conditions associated with scale. The virtual physics module 312 can be configured to access one or more physics rules and/or parameters stored in the memory 380, the memory 308 and/or another memory (not shown) in response to scale of a user.

As noted above, a controller, such as, for example, the handheld electronic device 102 described above, may be manipulated by a user for interaction and navigation in the virtual reality environment. In some implementations, the light source 108 may direct a ray or beam toward a virtual item to be selected by the user. When navigating in the virtual reality environment, the user may use this type of beam emitted by the handheld electronic device 102 identify, for example, a virtual feature and/or location to be selected by the user.

Figure 4A:
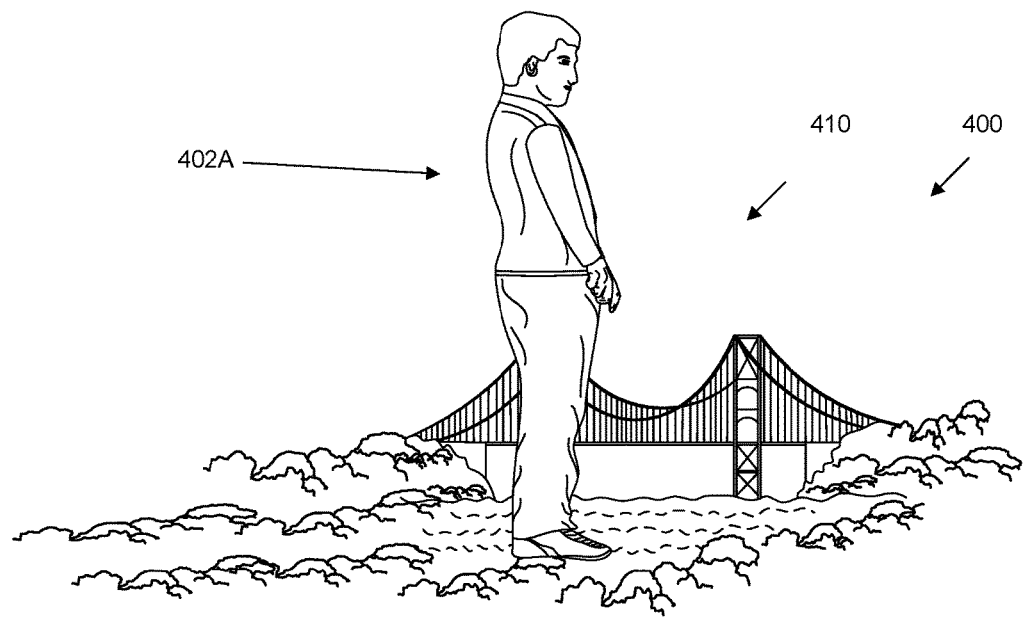
FIGS. 4A through 4C depict a user in a virtual reality environment, where the user has a different scale relative to the virtual reality environment in the respective images.
Figure 4B:
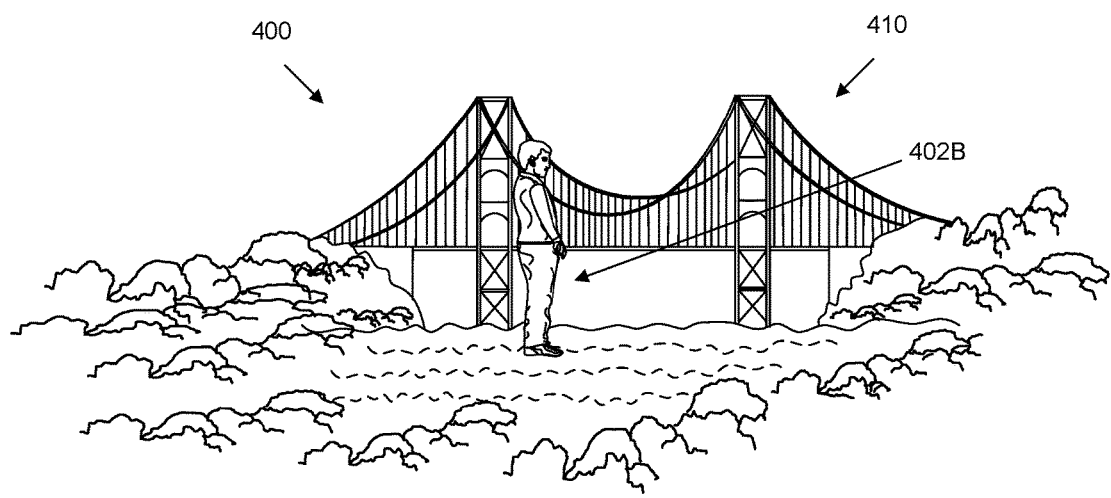
Figure 4C:
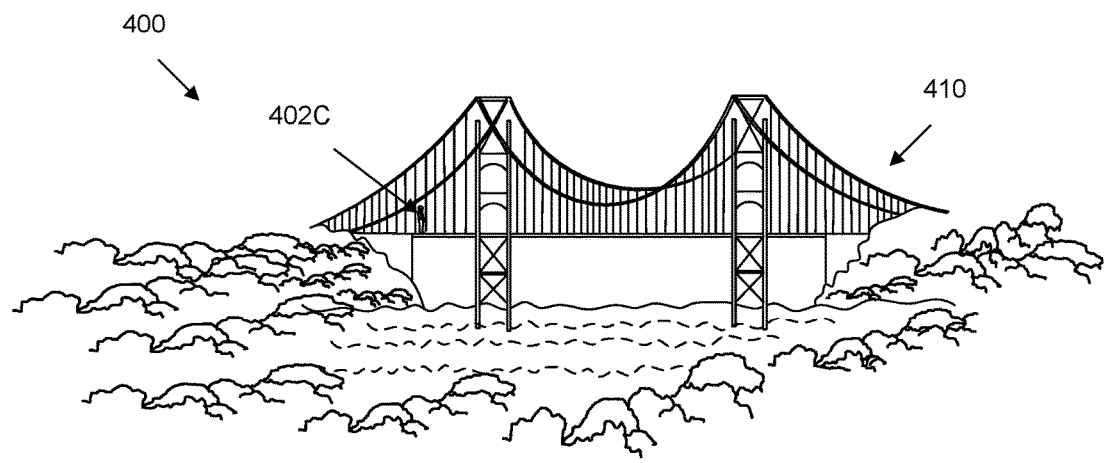

FIGS. 4A through 4C depict a virtual reality environment 400 and a scale of user 402 (illustrated as 402A, 402B, and 402C in the various views) within the virtual reality environment 400. FIGS. 4A through 4C illustrate a perspective from a third party viewing the virtual environment 400 and the user 402 to facilitate the description. Virtual reality environment 400 may be created and displayed to the user 402 within a virtual reality system (not shown), in which case the virtual environment 400, and the objects therein, are viewed from the first-person perspective of the user 402 without viewing the entirety of themselves. The virtual reality system can include, for example, an HMD 100, portable handheld electronic device 102, first electronic device 300, and/or second electronic device 302.

The virtual reality environment 400 displayed to the user via HMD 100 may be associated with caleer 402 as a giant user 402A (represented in FIG. 4A), a medium user 402B (represented in FIG. 4B), and/or a pedestrian user 402C (represented in FIG. 4C). In addition, virtual environment 400 may include one or more graphical representations of physical structures, such as bridge 410, for example. The size of the user 402 is changed (e.g., scaled) in the various views, while the size of the bridge 410 in the virtual environment 400 is not changed.

In this example, a giant virtual physics rule having at least one giant physics parameter may be associated with giant user 402A and may be applied to interactions between giant user 402A and bridge 410. Such interactions between giant user 402A and bridge 410 may be initiated or directed by portable electronic device 102, first electronic device 300, or second electronic device 302. Likewise, a medium virtual physics rule having at least one medium physics parameter may be associated with medium user 402B and may be applied to interactions between medium user 402B and bridge 410. For additional example, a pedestrian virtual physics rule having at least one pedestrian physics parameter may be associated with pedestrian user 402C and may be applied to interactions between pedestrian user 402C and bridge 410.

In this example, the giant user 402A, medium user 402B and pedestrian user 402C are the same user interacting with the bridge 410 at different times after scaling. In some implementations, the giant user 402A, medium user 402B and pedestrian user 402C can be different users interacting simultaneously, or substantially simultaneously with the bridge 410 or its surroundings.

In some implementations, pedestrian user 402C may be modified to be medium user 402B or giant user 402A, such as by scaling module 310. The giant, medium, and pedestrian physics parameters may be determined based at least in part on the relative size or scale of giant user 402, medium user 402B, and pedestrian user 402C. For example, such giant, medium, and pedestrian physics rules may include approximations of Newtonian mechanics, quantum mechanics, electromagnetism, etc. Giant, medium, and pedestrian physics parameters may include mass, friction, time duration, density, to name but a few examples. In one example, a mass of bridge 410 may be modified by virtual physics module 312 for giant user 402A, medium user 402B, or pedestrian user 402C based at least in part on the respective size of those users relative to bridge 410. The mass may be modified by modifying a large physics rule, a medium physics rule, or a small physics rule. The mass may also be modified by modifying a giant physics parameter, a medium physics parameter, or a pedestrian physics parameter. The mass may also be modified by modifying a combination of a physics rule and a physics parameter.

In some implementations, the physics rule of (or applied to) the object (e.g., bridge 410) may be modified based on the size of the user. For example, the physical properties of bridge 410 may under some circumstances be modified for one of the above users based on the size of the users. In other words, bridge 410 may be modified such that it has sufficient mass and strength for pedestrian user 402C to walk across the bridge. Likewise, bridge 410 may be modified such that it has less mass and greater rigidity for giant user 402A. For giant user 402A, bridge 410 may respond in a manner similar to that of a toy or miniature bridge would in response to interactions with giant user 402A. For example, if bridge 410 were to fall over, such a movement would appear to occur fairly quickly and may fall over without appearing to twist or torque to giant user 402A, as if bridge 410 were a small toy. For pedestrian user 402C, however, bridge 410 may appear to fall over fairly slowly as if the bridge were a typical pedestrian overpass or other similar real world structure for example and similarly may exhibit twisting or torqueing while falling over. Each of giant user 402A, medium user 402B, and/or pedestrian user 402C may have their respective interactions with bridge 410 controlled at least in part by a respective giant, medium, or pedestrian virtual physics rule or a respective giant, medium, or pedestrian parameter associated with a virtual physics rule such that bridge 410 may appear to respond correctly based at least in part on a relative scale of giant users 402A, medium user 402B, and/or pedestrian user 402C. It should be noted that the above are merely illustrative examples and claimed subject matter should not be limited to the examples provided.

Figure 5:
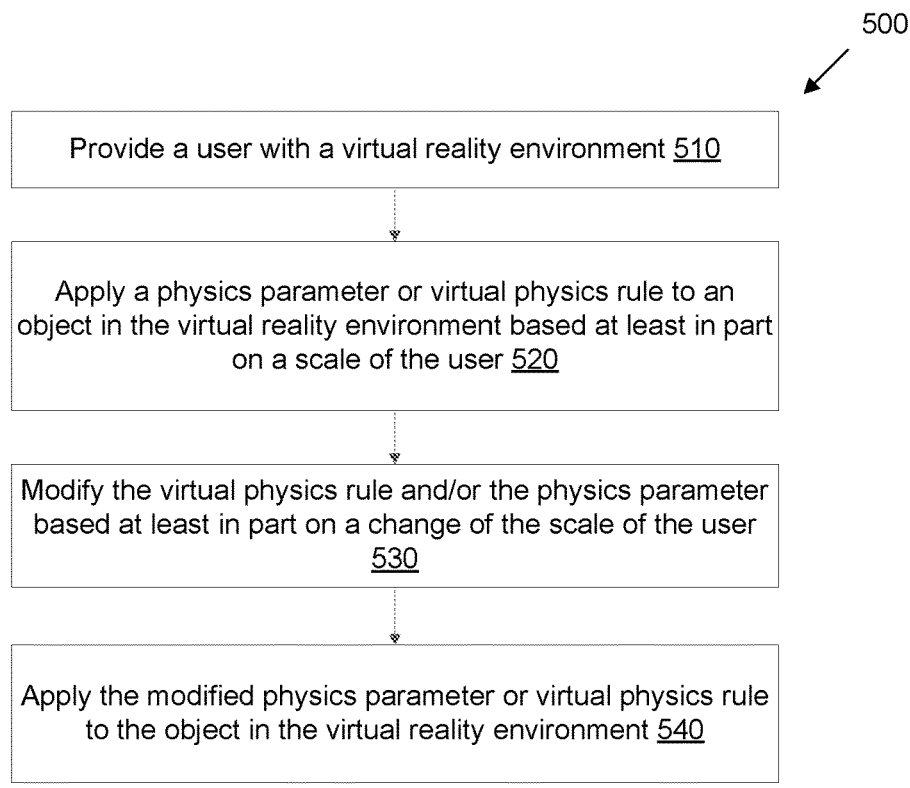
FIG. 5 depicts a flow diagram relating to determining one or more physics rules for a user in a virtual reality environment in accordance to an example embodiment.

FIG. 5 depicts a flow diagram in accordance with an example embodiment. With regard to FIG. 5, a virtual reality system may provide a user with a virtual reality environment (block 510). In this example, the virtual reality system may be any system, device, and/or component described above with regard to other example embodiments. Such a virtual reality environment may allow a user to interact with one or more objects within the virtual reality environment, such as by using one of the systems or devices described above. In this example, the virtual reality system may apply a virtual physics rule and/or a virtual physics parameter associated with the virtual physics rule to an object in the virtual reality environment based at least in part on a scale of the user (block 520). In this manner, the user may be presented with a desired interaction with the object such that the object appears to have a set of desired properties and behave in desired ways, such as an approximation of a real world interaction between the user and a similar real world object.

In this example, the virtual reality system may modify the virtual physics rule and/or the virtual physics parameter based at least in part on a change of the scale of the user (block 530). For example, the scale of the user may initially be normal-sized and may be changed such that the user is large sized such as twice the normal size. In this example, the virtual physics rule and/or the virtual physics parameter may be modified at least in part so that objects may interact in a desired way with the large sized user. In this example, the virtual reality system may apply the modified virtual physics rule and/or the modified virtual physics parameter to the object in the virtual reality environment (block 540). For example, the modified virtual physics rule and/or modified virtual physics parameter may provide the user with an at least somewhat realistic interaction in the virtual reality environment that approximates a similar interaction in the real world. In some implementations, a representation of the user and/or the object (and/or an interaction thereof) can be displayed in an HMD based on the modified virtual physics rule and/or modified virtual physics parameter.

Figure 6:
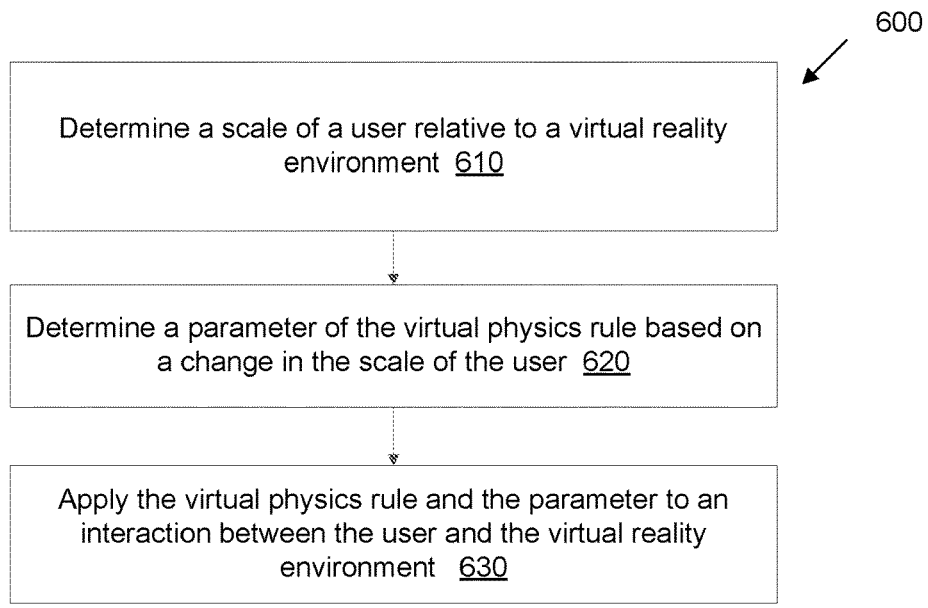
FIG. 6 depicts a flow diagram relating to determining a scale of a user relative to a virtual reality environment in accordance to an example embodiment.

FIG. 6 depicts a flow diagram in accordance with an example embodiment. With regard to FIG. 6, a virtual reality system may determine a scale of a user relative to a virtual reality environment (block 610). For example, the virtual reality system may determine the scale based on the user's size (e.g., a smaller size, a normal size, or a larger size) relative to an object in the virtual reality environment. The virtual reality environment may include an associated virtual physics rule. The virtual reality system may further determine a parameter of the virtual physics rule based on a change in the scale of the user relative to the virtual reality environment (block 620). For example, the physics parameters may be determined based on at least the relative scale of the user's size (e.g., a smaller size, a normal size, or a larger size). The virtual reality system may then apply the virtual physics rule and the parameter to an interaction between the user and the virtual reality environment (block 630). In this manner, a physics rule or a parameter of a physics rule may be adjusted such that information provided to the virtual reality system may still appear and or feel appropriate to the user regardless of size.

Figure 7:
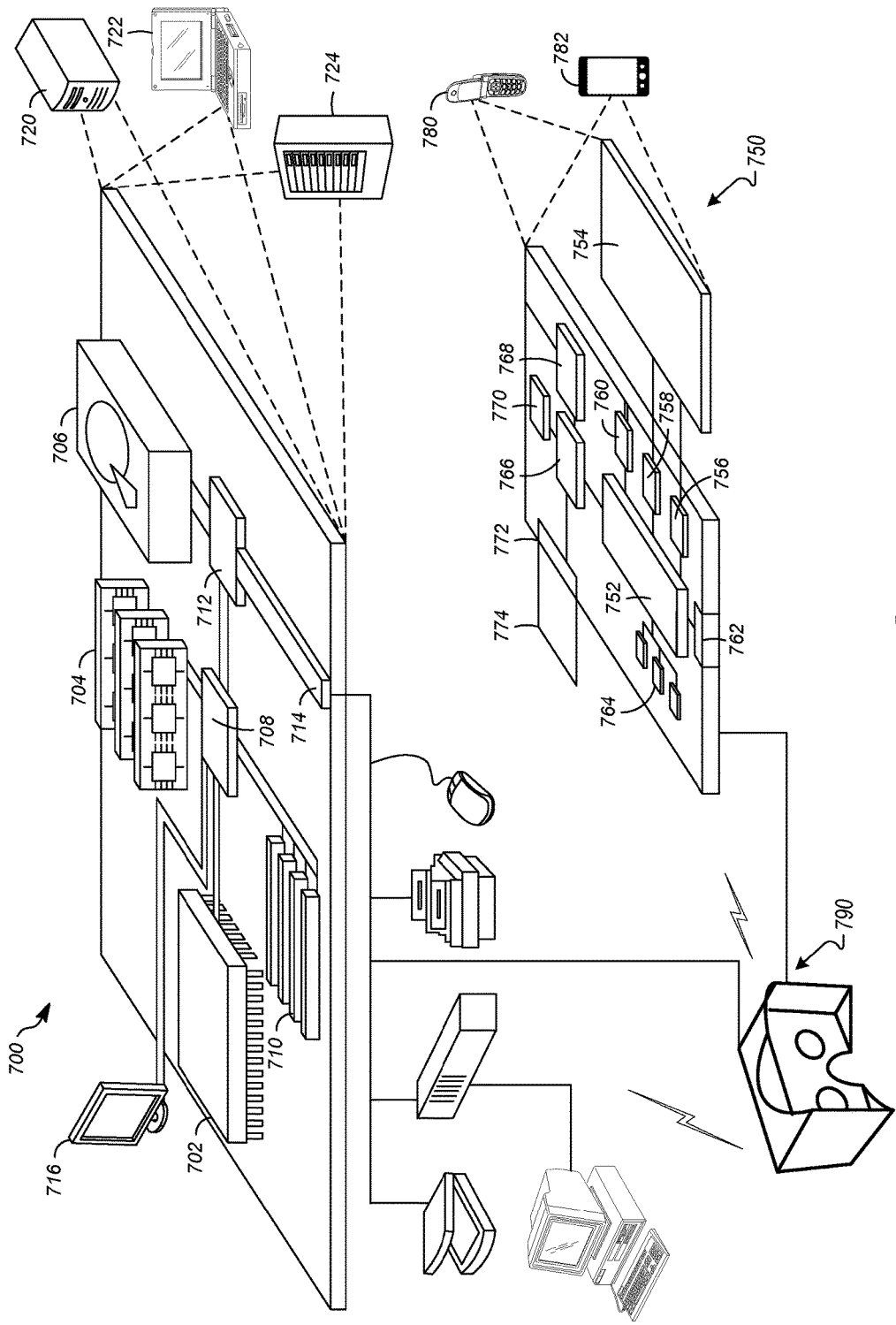
FIG. 7 shows an example of a computer device and a mobile computer device that can be used to implement the techniques described herein.

FIG. 7 shows an example of a generic computer device 700 and a generic mobile computer device 750, which may be used with the techniques described here. Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. In addition, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 608 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 7 can include sensors that interface with a virtual reality (VR headset 790). For example, one or more sensors included on a computing device 750 or other computing device depicted in FIG. 7, can provide input to VR headset 790 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 750 can use the sensors to determine an absolute position and/or a detected rotation of the computing device in the VR space that can then be used as input to the VR space. For example, the computing device 750 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 750 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the VR space can cause a particular action to occur in the VR space.

In some implementations, a touchscreen of the computing device 750 can be rendered as a touchpad in VR space. A user can interact with the touchscreen of the computing device 750. The interactions are rendered, in VR headset 790 for example, as movements on the rendered touchpad in the VR space. The rendered movements can control objects in the VR space.

In some implementations, one or more output devices included on the computing device 750 can provide output and/or feedback to a user of the VR headset 790 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the VR space. In the example of the laser pointer in a VR space, the computing device 750 appears as a virtual laser pointer in the computer-generated, 3D environment. As the user manipulates the computing device 750, the user in the VR space sees movement of the laser pointer. The user receives feedback from interactions with the computing device 750 in the VR space on the computing device 750 or on the VR headset 790.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Further implementations s are summarized in the following examples:

Example 1

A method comprising: determining a physics parameter based at least in part on a scale of user relative to an object in a virtual reality environment; applying a physics rule to an interaction between the user and the object in the virtual reality environment based on the physics parameter; and modifying the physics parameter based at least in part on a relative change in scale between the user and the object.

Example 2

The method of example 1, wherein the user interacts with the object which is determined by the physics parameter associated with the physics rule in a manner to simulate real world interaction between the user and the object.

Example 3

The method of example 1 or 2, further comprising scaling the user from a first size to a second size.

Example 4

The method of example 3, wherein the second size is smaller than the first size.

Example 5

The method of example 3, wherein the second size is larger than the first size.

Example 6

The method of one of examples 3 to 5, wherein when the user is scaled to the second size, the physics parameter associated with the physics rule of the user having the second size is different from the physics parameter associated with the physics rule of the user having the first size.

Example 7

The method of example 1 or 2, further comprising scaling the object from a first size to a second size.

Example 8

The method of example 7, wherein the second size is smaller than the first size.

Example 9

The method of example 7, wherein the second size is larger than the first size.

Example 10

The method of example 7, wherein when the object is scaled to the second size, the physics parameter associated with the physics rule of the object having the second size is different from the physics parameter associated with the physics rule of object having the first size.

Example 11

The method of one of examples 1 to 10, further comprising multiple users within the virtual reality environment, the multiple users interact substantially simultaneously relative to the object.

Example 12

The method of one of examples 1 to 11, wherein the physics rule includes multiple physics parameters.

Example 13

The method of one of examples 1 to 12, wherein the physics rule includes a mathematical representation of at least one of gravity, friction, force, mass, acceleration, weight, density, velocity, momentum, or speed.

Example 14

A method comprising: determining a scale of a user relative to a virtual reality environment, the virtual reality environment having an associated virtual physics rule; determining a parameter of the virtual physics rule based on a change in the scale of the user relative to the virtual reality environment; and applying the virtual physics rule and the parameter to an interaction between the user and the virtual reality environment.

Example 15

The method of example 14, wherein the user has multiple scale sizes interacting with an object within the virtual reality environment.

Example 16

The method of example 15, wherein the multiple scale sizes include a first scale and a second scale.

Example 17

The method of one of examples 14 to 16, wherein the parameter of the virtual physics rule has a magnitude determined based on an equation, the equation being dependent on the scale of the user.

Example 18

A system, comprising: a computing device configured to generate a virtual environment, the computing device including: a memory storing executable instructions; and a processor configured to execute the instructions, to cause the computing device to: determine a physics parameter based at least in part on a scale of user relative to an object in a virtual reality environment, apply a physics rule to an interaction between the user and the object in the virtual reality environment based on the physics parameter, and modify the physics parameter based at least in part on a relative change in scale between the user and the object.

Example 19

The system of example 18, wherein the parameter of the virtual physics rule has a magnitude determined based on an equation, the equation being dependent on the scale of the user.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
   determining a physics parameter based at least in part on a scale of user relative to an object in a virtual reality environment;
   applying a physics rule to an interaction between the user and the object in the virtual reality environment based on the physics parameter;
   modifying the physics parameter based at least in part on a relative change in scale between the user and the object; and
   trigger displaying, via a head-mounted display (HMD), the interaction between the user and the object based on the virtual physics rule with the modified physics parameter.

2. The method of claim 1, wherein the user interacts with the object which is determined by the physics parameter associated with the physics rule in a manner to simulate real world interaction between the user and the object.

3. The method of claim 1, further comprising scaling the user from a first size to a second size.

4. The method of claim 3, wherein the second size is smaller than the first size.

5. The method of claim 3, wherein the second size is larger than the first size.

6. The method of claim 3, wherein when the user is scaled to the second size, the physics parameter associated with the physics rule of the user having the second size is different from the physics parameter associated with the physics rule of the user having the first size.

7. The method of claim 1, further comprising scaling the object from a first size to a second size.

8. The method of claim 7, wherein the second size is smaller than the first size.

9. The method of claim 7, wherein the second size is larger than the first size.

10. The method of claim 7, wherein when the object is scaled to the second size, the physics parameter associated with the physics rule of the object having the second size is different from the physics parameter associated with the physics rule of object having the first size.

11. The method of claim 1, further comprising multiple users within the virtual reality environment, the multiple users interact substantially simultaneously relative to the object.

12. The method of claim 1, wherein the physics rule includes multiple physics parameters.

13. The method of claim 1, wherein the physics rule includes a mathematical representation of at least one of gravity, friction, force, mass, acceleration, weight, density, velocity, momentum, or speed.

14. A method comprising:
   determining a scale of a user relative to a virtual reality environment, the virtual reality environment having an associated virtual physics rule;
   determining a parameter of the virtual physics rule based on a change in the scale of the user relative to the virtual reality environment;
   applying the virtual physics rule and the parameter to an interaction between the user and the virtual reality environment based on the changed scale of the user; and
   trigger displaying, via a head-mounted display (HMD), the interaction between the user and the virtual reality environment based on the virtual physics rule and the parameter.

15. The method of claim 14, wherein the user has multiple scale sizes interacting with an object within the virtual reality environment.

16. The method of claim 15, wherein the multiple scale sizes include a first scale and a second scale.

17. The method of claim 14, wherein the parameter of the virtual physics rule has a magnitude determined based on an equation, the equation being dependent on the scale of the user.

18. A system, comprising:
   a head-mounted display (HMD) including at least a display screen to display a virtual environment;
   a computing device configured to generate the virtual environment, the computing device including:
      a memory storing executable instructions; and
      a processor configured to execute the instructions, to cause the computing device to:
         determine a physics parameter based at least in part on a scale of user relative to an object in a virtual reality environment,
         apply a physics rule to an interaction between the user and the object in the virtual reality environment based on the physics parameter,
         modify the physics parameter based at least in part on a relative change in scale between the user and the object; and
         trigger display of the interaction between the user and the object based on the physics rule with the modified physics parameter.

19. The system of claim 18, wherein the parameter of the virtual physics rule has a magnitude determined based on an equation, the equation being dependent on the scale of the user.

* * * * *